United States Patent [19]

Schmidt

[11] 4,392,876
[45] Jul. 12, 1983

[54] FILTER PACKING

[75] Inventor: Klaus Schmidt, Kaiserslautern, Fed. Rep. of Germany

[73] Assignee: Firma Carl Freudenberg, Weinheim, Fed. Rep. of Germany

[21] Appl. No.: 302,574

[22] Filed: Sep. 15, 1981

[30] Foreign Application Priority Data

Sep. 15, 1980 [EP] European Pat. Off. ........... 80105531

[51] Int. Cl.³ .............................................. B01D 39/14
[52] U.S. Cl. ....................................... 55/524; 55/528; 210/506; 428/375; 428/378; 428/903
[58] Field of Search ................ 55/522, 524, 523, 527, 55/528, DIG. 13; 210/506; 428/378, 903, 375, 290, 317.9; 427/27, 30, 244, 373

[56] References Cited

U.S. PATENT DOCUMENTS

| | | | |
|---|---|---|---|
| 2,810,426 | 10/1957 | Till et al. | 55/528 |
| 3,118,750 | 1/1964 | Dunlap et al. | 55/524 |
| 4,169,911 | 10/1979 | Yoshida et al. | 428/378 |
| 4,265,972 | 5/1981 | Rudner | 428/375 |
| 4,286,977 | 9/1981 | Klein | 55/524 |

*Primary Examiner*—Bernard Nozick
*Attorney, Agent, or Firm*—Kenyon & Kenyon

[57] ABSTRACT

A filter packing of electrostatically spray formed microfibers, the structure of which is a foamed coating layer containing open cell pores completely surrounding a nonporous fiber core. The pores extend perpendicularly through the foamed coating and have a substantially uniform distribution in cross section. The foamed coating and the fiber core are made of the same polymer composition.

5 Claims, 2 Drawing Figures

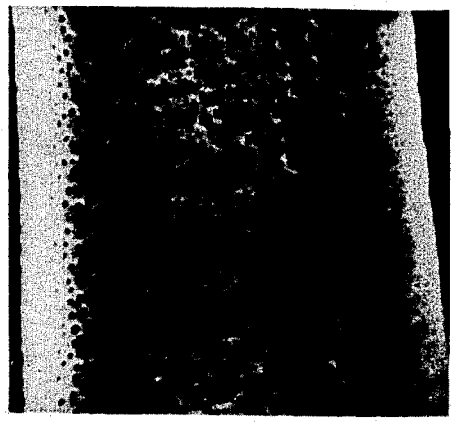
Figur 1

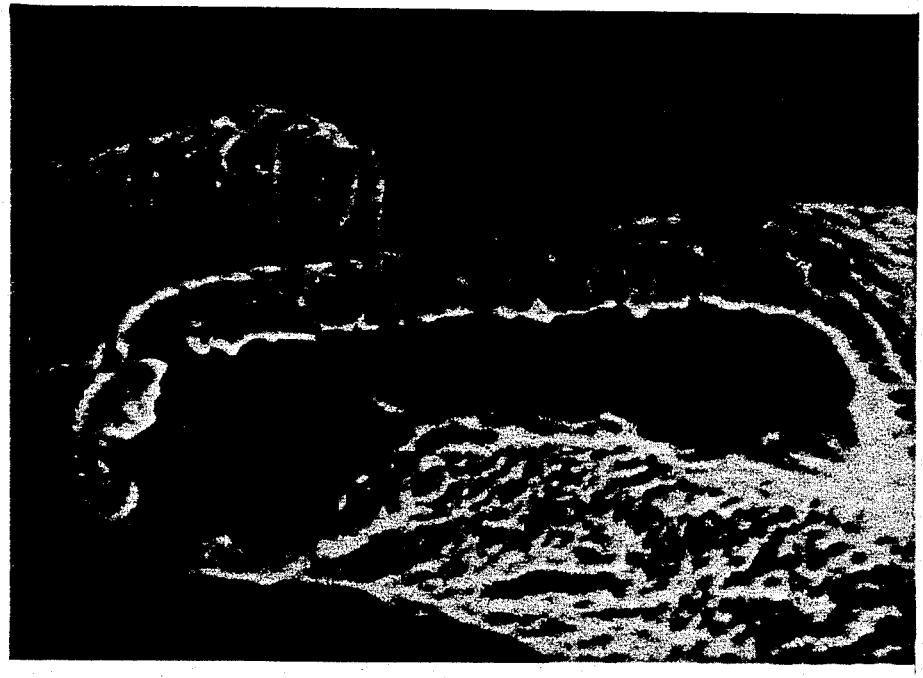

FILTER PACKING

BACKGROUND OF THE INVENTION

The invention relates to a filter packing containing electrostatically formed porous microfibers.

A related filter packing is described in German patent DE-OS No. 20 32 072. The fibers employed in this packing often are ribbon-shaped, and they exhibit an irregular, highly porous surface structure. The cross sectional area of the individual pores is enlarged in the vicinity of the surface openings of the pores and their number increases considerably toward the outside surfaces of the fibers. Such fibers have a low mechanical strength and it has been found that the degree of separation of particles obtained with a filter packing formed therefrom seldom achieves desirable levels. For example such filters do not meet the requirements set for typical applications such as air conditioning equipment for nuclear installations, wherein the filters must ensure a high degree of separation of radioactively contaminated particles from air. Another application with similarly stringent requirements is purification of breathing air for which the removal of noxious substances while incurring the lowest possible air resistance is important. Such noxious substances may be contained in solid or liquid suspended particles which are chemically or biologically contaminated.

Therefore, it is an object of the invention to develop a filter packing for use in very fine filtration which allows a high degree of particle separation of such very fine substances while providing low air flow resistance.

SUMMARY OF THE INVENTION

This and other objects are achieved by the invention which is directed to a filter packing made of microfibers having a nonporous fiber core surrounded by a foamed coating layer containing open-cell pores. The pores extend through the foamed coating in a substantially perpendicular direction relative to the surface and the cross section distribution of pores is substantially uniform. The formed coating and the fiber core are made of the same polymer composition.

BRIEF DESCRIPTION OF THE DRAWINGS

In the drawings FIG. 1 shows a top view, at a scale of 7000:1, of a microfiber of the type employed by the invention.

FIG. 2 shows the fiber according to FIG. 1 in a cross-sectional view at a scale 14,000:1. The uniformity of the foamed coating layer with respect to pore size and distribution is clearly illustrated. Easily recognizable is the clear demarcation of the foamed coating and the nonporous fiber core which has a molecular orientation.

DETAILED DESCRIPTION OF THE INVENTION

The structure and physical properties of the microfibers used to make the filter packing of the invention as well as the electrostatic process to make them are described in applicant's copending application SN 302572 entitled "Electrostatically Formed Fiber of Polymer Material" which was filed on the same date as the present application and is incorporated herein by reference. The microfibers have a solid fiber core surrounded by a foamed coating layer containing open cell pores. The pores are predominantly shaped like vertical cylinders, the divergence angle in the direction of the opening being less than 15°. They thereby form cavities which slow down the flow of gases passing the opening, and in which microparticles can be deposited largely inependently of the flow resistance of the gas.

The microfibers have a maximum diameter of 1 to 20 microns. Due to the lack of pores in the fiber core, the microfibers have a high tensile strength, whereby breakage of the fiber components or mutual compression is substantially prevented at high air flow velocities. The original air flow resistance is thereby substantially preserved after extended use. The microfibers can additionally be stabilized by a uniform admixture of wrinkled staple fibers. This makes possible a great depth of the filter packing while the flow resistance remains the same and offers an additional margin of safety against breakthrough of contaminated particles.

The staple fibers and the microfibers should be of the same polymer composition in order to ensure that the electrostatic dipolar interaction of the microfibers is preserved substantially undisturbed. This improves the degree of particle separation achieved by the filter packing.

Depending on the intended application, the external shape of the filter packing can be varied. With respect to the manufacture of a pocket filter, it is practical to deposit the microfibers over an area with random distribution and optionally press them together. With respect to the purification of gases, the impurities of which are accumulated over a large spectrum of diameters, it has been found to be advantageous to arrange the proposed filter packing as the last filter behind a sequence of other filters of increasing fineness. The latter can likewise comprise fibrous material and it is possible, of course, to arrange all filters directly on top of each other and optionally, to anchor them in a common edge-clamping device. In particularly critical situations fluttering can be prevented by a unitary pressing-together between plastic grids. In this manner, the intensity of the pressing being applied will increase the flow resistance and the degree of particle separation achieved. The user thereby has the possibility of adapting both parameters to his particular conditions.

If the filter packing comprises a mixture of microfibers and staple fibers, it is advantageous to have a ratio of the mean diameter of the staple fibers and the largest diameter of the microfibers of from 3:1 to 10:1. Both kinds of fibers may in principle be any polymer composition which can be used in an electrostatic spray formation process. It is merely necessary to assure that the microfibers obtained assume the foregoing shape with the area portion of the surface covered by the pores being 10 to 99% with a diameter of 0.01 to 0.5 microns and a depth of 0.1 to 2 microns. Such microfibers can be obtained, according to the invention by using a solution of polycarbonate in methylene chloride and processing according to the conditions outlined in applicant's above mentioned copending application. The cross sectional share of the foamed coating layer relative to the total cross section is 40 to 80% and preferably 60%. The total available pore volume is accordingly considerable and allows the adsorption of large amounts of impurities.

What is claimed is:

1. A filter packing comprising a composite of electrostatically spray formed microfibers alone or in combination with one or more porous carrier layers, wherein the microfibers comprise a nonporous fiber core surrounded by a foamed coating layer containing open cell pores which extend through the foam coating in a substantially perpendicular direction to the surface, the cross section distribution of pores being substantially uniform and the foamed coating and the fiber core being made of the same polymer composition.

2. A filter packing according to claim 1, wherein the microfibers are deposited with random distribution, and with thir long axes perpendicular to the direction of air flow and are optionally pressed together.

3. A filter packing according to claim 1 or 2, wherein the microfibers are mixed in a substantially uniform manner with wrinkled staple fibers.

4. A filter packing according to claim 3, wherein the staple fibers comprise the same or a similar polymer composition as that comprising the microfibers.

5. A filter packing according to claim 4, wherein that ratio of the mean diameter of the staple fibers to the maximum diameter of the microfibers is 3:1 to 10:1.

* * * * *